(12) United States Patent
Ellmer et al.

(10) Patent No.: US 6,637,204 B2
(45) Date of Patent: Oct. 28, 2003

(54) DEVICE AND METHOD FOR THE HEATING OF A CATALYTIC CONVERTER FOR A SUPERCHARGED INTERNAL COMBUSTION ENGINE

(75) Inventors: Dietmar Ellmer, Regensburg (DE); Jörg Neugärtner, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/016,865

(22) Filed: Dec. 14, 2001

(65) Prior Publication Data

US 2002/0083700 A1 Jul. 4, 2002

(30) Foreign Application Priority Data

Dec. 14, 2000 (DE) .......................... 100 62 377

(51) Int. Cl.[7] .................. F02B 33/44; F01N 3/22; F02M 25/07
(52) U.S. Cl. .............. 60/606; 60/607; 60/608; 60/274; 60/280; 60/300; 60/303; 60/304
(58) Field of Search ................. 60/274, 280, 606, 60/300, 303, 304, 608, 607

(56) References Cited

U.S. PATENT DOCUMENTS 5,136,842 A * 8/1992 Achleitner et al. ........... 60/274
6,470,864 B2 * 10/2002 Kim et al. .................... 60/606

FOREIGN PATENT DOCUMENTS

EP          0 469 170 A1    2/1995

* cited by examiner

Primary Examiner—Sheldon J. Richter
(74) Attorney, Agent, or Firm—Laurence A. Greenberg; Werner H. Stemer; Ralph E. Locher

(57) ABSTRACT

In a two-stage concept for supercharging of internal combustion engines, in which the first stage is performed by an exhaust-gas turbocharger and the second stage by an electrically driven compressor, the compressor is also used to provide the secondary air used for the heating of a catalytic converter. In this manner, the catalytic converter quickly reaches an efficient operating temperature.

6 Claims, 4 Drawing Sheets

DEVICE AND METHOD FOR THE HEATING OF A CATALYTIC CONVERTER FOR A SUPERCHARGED INTERNAL COMBUSTION ENGINE

BACKGROUND OF THE INVENTION

Field of the Invention

The invention relates to a device and a method for the heating of a catalytic converter for an internal combustion engine, which is equipped with electrically assisted exhaust gas turbocharging.

The pollutant emission of an internal combustion engine can be effectively reduced through catalytic after-treatment using a catalytic converter. An important prerequisite for this, however, is that the catalytic converter has reached its operating temperature. Various warm-up strategies are known for ensuring rapid attainment of the so-called light-off temperature while nevertheless reducing the emission of pollutants during the cold starting phase of the internal combustion engine, in which approximately 70 to 90% of the total HC and CO pollutants are emitted during the first 10–15 seconds.

A very effective method that is frequently employed for heating the catalytic converter during cold starting is the admission of high-oxygen containing secondary air (ambient air) upstream of the catalytic converter, which when given a simultaneously high proportion of unburned fuel in the exhaust gas leads to rapid heating of the catalytic converter due to afterburning of the fuel. For the injection of the secondary air into the exhaust line upstream of the catalytic converter, however, it is necessary to produce a pressure gradient, since the exhaust gas pressure generally exceeds the ambient pressure.

The build-up of excess pressure in relation to the exhaust gas pressure is generally achieved by a separate secondary air pump. Published, European Patent Application EP 0 469 170 A1 discloses a method for the heating of the catalytic converter for an internal combustion engine, in which secondary air is injected downstream of the exhaust valves by a separate secondary air pump. An electrically actuatable pump, such as a vane pump, the delivery of which is adjustable, here serves as the secondary air pump. The delivery is pilot-controlled as a function of operating parameters of the internal combustion engine and with active lambda control according to a probe signal of a lambda probe the pilot control is corrected by an override control.

A further known method of increasing the volumetric efficiency and thereby boosting the power output of the internal combustion engine is to provide an exhaust-gas turbocharger, the turbine of which is disposed in the exhaust line and is mechanically connected by way of a shaft to a compressor disposed in the intake line. The exhaust gases from the internal combustion engine consequently drive the turbine and this in turn drives the compressor. The compressor delivers a pre-compressed fresh charge to the internal combustion engine. An air intercooler connected to the compressor on the outlet side dissipates compression heat via a coolant circuit of the internal combustion engine. The volumetric efficiency can thereby be further improved.

In order to avoid the disadvantages of the conventional turbocharger system, especially the relatively low torque at low speeds and the so-called "turbo lag", an electrically assisted exhaust-gas turbocharger systems have been proposed (see the references by Zellbeck, Hans; Friedrich, J ürgen; and Berger, Carsten: titled "Die elektrisch unterst ützte Abgasturboaufladung als neues Aufladekonzept" [The Electrically Assisted Exhaust Gas Turbocharger for a New Charging Concept], MTZ Motortechnische Zeitschrift 60 (1999), 6, pages 386–391, and by S. M. Shahed et al: titled "Elektrisch unterstützte Turboladersysteme für konventionelle Hybrid- und Brennstoffzellenantriebe" [Electrically Assisted Turbo Charged System for Conventional Hybrid and Fuel Cell Engines], 21$^{st}$ International Viennese Motor Symposium, May 4–5 2000, Series 12, Verkehrstechnik/Fahrzeugtechnik No. 420, Vol. 1, p. 310–324).

In this case, in order to assist the exhaust-gas turbocharger either an electric motor is fitted on the shaft of the turbocharger that connects the turbine to the compressor, or an electrically driven centrifugal compressor is provided, which as additional air source is connected in series to the compressor of the exhaust-gas turbocharger.

SUMMARY OF THE INVENTION

It is accordingly an object of the invention to provide a device and a method for the heating of a catalytic converter for a supercharged internal combustion engine which overcome the above-mentioned disadvantages of the prior art methods and devices of this general type, by which secondary air injection can occur.

With the foregoing and other objects in view there is provided, in accordance with the invention, a device for heating a catalytic converter disposed in an exhaust line of a supercharged internal combustion engine. The device contains an exhaust-gas turbocharger having a compressor disposed in an intake line of the supercharged internal combustion engine and a turbine with a shaft connected to and driving the compressor. The turbine is disposed in the exhaust line of the supercharged internal combustion engine. An electrically driven compressor is disposed, upstream of the compressor of the exhaust-gas turbocharger, in the intake line of the supercharged internal combustion engine. A branch is connected to the intake line downstream of the electrically driven compressor and through the branch at least a proportion of air compressed by the electrically driven compressor can be diverted. The branch is connected to the exhaust line upstream of the catalytic converter of the supercharged internal combustion engine, so that with the electrically driven compressor switched on secondary air is introduced into the exhaust line as required.

With the foregoing and other objects in view there is further provided, in accordance with the invention, a device for heating a catalytic converter disposed in an exhaust line of a supercharged internal combustion engine. The device contains an exhaust-gas turbocharger having a compressor disposed in an intake line of the internal combustion engine and a turbine with a shaft connected to and driving the compressor. The turbine is disposed in the exhaust line of the supercharged internal combustion engine. An electric motor is disposed on the shaft and additionally drives the compressor of the exhaust-gas turbocharger independently of the turbine of the exhaust-gas turbocharger in certain operating ranges of the supercharged internal combustion engine. A branch is connected to the intake tract downstream of the compressor, and through the branch at least a proportion of air compressed by the compressor can be diverted. The branch is connected to the exhaust line upstream of the catalytic converter of the supercharged internal combustion engine, so that with the compressor switched on secondary air is introduced into the exhaust line as required.

The invention is characterized in that in a two-stage concept for supercharging internal combustion engines, in which the first stage is performed by a conventional exhaust-gas turbocharger containing the turbine and the compressor, and the second stage by the electrically driven compressor. The electrically driven compressor is also used to provide the secondary air used for the heating of the catalytic converter.

The pressure gradient produced by the electrically driven compressor permits a secondary air injection into the exhaust line without the need for a separate secondary air pump. In addition to a reduction in the cost of the overall system, this also results in a compact configuration of the exhaust after-treatment system.

In accordance with an added feature of the invention, an electrically actuatable shutoff valve is inserted in the branch.

In accordance with an additional feature of the invention, the branch opens into the exhaust line at a point close to exhaust valves of the supercharged internal combustion engine.

In accordance with a further feature of the invention, the branch opens into the exhaust line at a point downstream of the turbine of the exhaust-gas turbocharger.

In accordance with another feature of the invention, a multi-way valve with connected branch lines is inserted in the branch downstream of the electrically actuatable shutoff valve. By use of the multi-way valve, the secondary air can either be introduced into the exhaust line at a point close to exhaust valves of the supercharged internal combustion engine, or into the exhaust line at a point downstream of the turbine of the exhaust-gas turbocharger, or simultaneously at both points.

With the foregoing and other objects in view there is provided, in accordance with the invention, a method for heating a catalytic converter disposed in an exhaust line of a supercharged internal combustion engine having an exhaust-gas turbocharger with a compressor disposed in an intake line of the internal combustion engine and driven by a shaft of a turbine disposed in the exhaust line of the supercharged internal combustion engine. The method includes disposing a further electrically driven compressor, serving to assist the exhaust-gas turbocharger, upstream of the compressor in the intake line of the internal combustion engine; and feeding at least a proportion of air compressed by the electrically driven compressor, as required, as secondary air into the exhaust line of the internal combustion engine upstream of the catalytic converter by way of a branch.

With the foregoing and other objects in view there is additionally provided, in accordance with the invention, a method for heating a catalytic converter disposed in an exhaust line of a supercharged internal combustion engine having an exhaust-gas turbocharger with a compressor disposed in an intake line of the internal combustion engine and driven by a shaft of a turbine disposed in the exhaust line of the supercharged internal combustion engine. The method includes disposing an electric motor on the shaft for additionally driving the compressor of the exhaust-gas turbocharger independently of the turbine of the exhaust-gas turbocharger in certain operating ranges of the supercharged internal combustion engine; and feeding at least a proportion of air compressed by the compressor, as required, as secondary air into the exhaust line of the supercharged internal combustion engine upstream of the catalytic converter by way of a branch.

Other features which are considered as characteristic for the invention are set forth in the appended claims.

Although the invention is illustrated and described herein as embodied in a device and a method for the heating of a catalytic converter for a supercharged internal combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
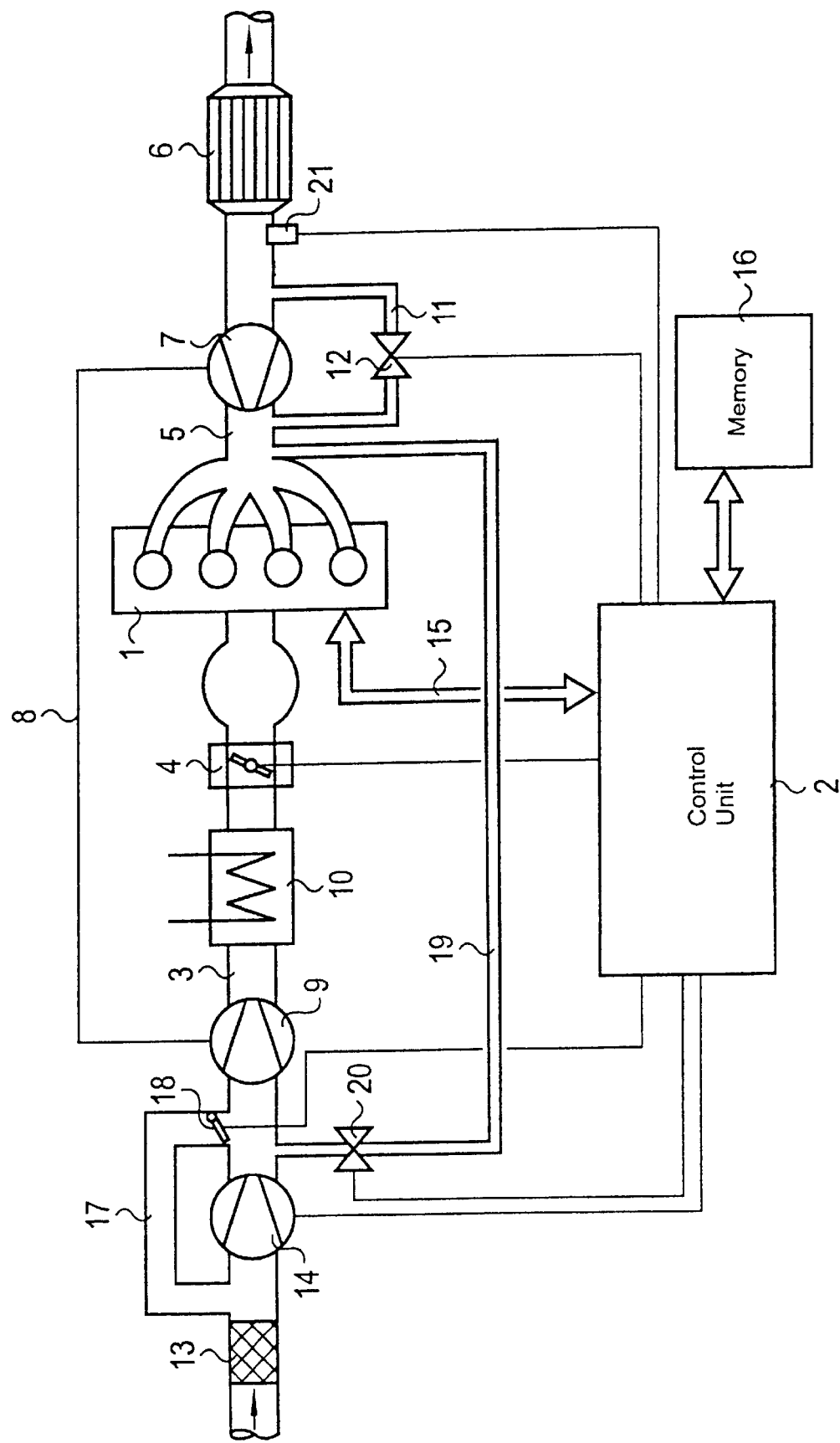
FIG. 1 is a block diagram of a first exemplary embodiment for the heating of a catalytic converter in a supercharged internal combustion engine.

Referring now to the figures of the drawing in detail and first, particularly, to FIG. 1 thereof, there is shown a supercharged internal combustion engine 1 with an electronic control unit 2 assigned thereto and is represented greatly simplified in the form of a block diagram. FIG. 1 shows only the parts that are necessary for an understanding of the invention. In particular, a representation of a fuel circuit and its constituent components has been omitted from the diagram. The internal combustion engine 1 may be either a spark-ignition internal combustion engine or a diesel internal combustion engine.

The air necessary for combustion is fed to the internal combustion engine 1 by way of an intake line 3, which contains an air filter 13 and a throttle valve 4. The exhaust gas from the internal combustion engine 1 flows by way of an exhaust line 5 to a catalytic converter 6 and then through a non-illustrated muffler into the open air. For controlling the catalytic converter measures, a temperature sensor 21, which delivers a corresponding signal to the control unit 2, is provided in the exhaust line 5 immediately upstream of the catalytic converter 6. The temperature sensor 21 may also be disposed inside the catalytic converter 6, or the temperature of the catalytic converter 6 is determined from operating parameters of the internal combustion engine 1 by a known temperature model.

In order to increase the volumetric efficiency and thereby boost the power output of the internal combustion engine 1, an exhaust-gas turbocharger is provided. A turbine 7 of which is disposed in the exhaust line 5 and mechanically connected by way of a shaft 8 to a compressor 9 disposed in the intake line 3. The exhaust gases from the internal combustion engine 1 therefore drive the turbine 7 and this in turn drives the compressor 9. The compressor 9 delivers a pre-compressed fresh air charge to the internal combustion engine 1. An air intercooler 10 connected to the compressor 9 on the outlet side dissipates compression heat by way of a coolant circuit of the internal combustion engine 1. The volumetric efficiency can thereby be further improved. In order that the exhaust-gas turbocharger does not overcharge the internal combustion engine 1 in the case of larger exhaust gas mass flows, which can occur at high speeds of the internal combustion engine 1, in this range a secondary flow is led off past the turbine 7 upstream of the catalytic converter 6 by way of a bypass line 11, into which a bypass valve 12 (waste-gate) is connected. The bypass valve 12 may be a valve that is controlled electrically or by the charge pressure.

Furthermore, for returning a proportion of the exhaust gases a non-illustrated exhaust gas recirculation line may be provided, which connects the exhaust line 5 to the intake line 3 in such a way that the exhaust gas is diverted upstream of the turbine 7 and returned into the intake line 3 at a point downstream of the air intercooler 10.

An electrically driven compressor 14 is inserted in the intake line 3 upstream of the compressor 9 of the exhaust-gas turbocharger. The compressor 14 serves to bridge the so-called exhaust turbo lag, a term that describes the poor response to acceleration on the part of the exhaust-gas turbocharger during certain changes of the operating range. The electrically driven compressor 14 is activated whenever supercharging in response to a demand, generally by the driver of the vehicle powered by the internal combustion engine 1, cannot be achieved rapidly enough with the required level of comfort, due to the inertia and the physical constraints on the conventional exhaust-gas turbocharger. If the electrically driven compressor 14, also known as a supercharger, is inoperative, air is delivered to the compressor 9 of the conventional exhaust-gas turbocharger by way of a bypass line 17, which, when the supercharger 14 is operative, is closed by an electrically actuatable flap or a valve 18.

According to the invention the electrically driven compressor 14 is also used for the injection of secondary air in the first few minutes after cold starting of the internal combustion engine 1. For this purpose a branch 19, also known as a secondary air line, is provided, which branches off downstream of the electrically driven compressor 14 and upstream of the entry of the bypass 17 into the intake line 3, and which leads to the exhaust line 5 at a point close to exhaust valves of the internal combustion engine 1.

Figure 3:
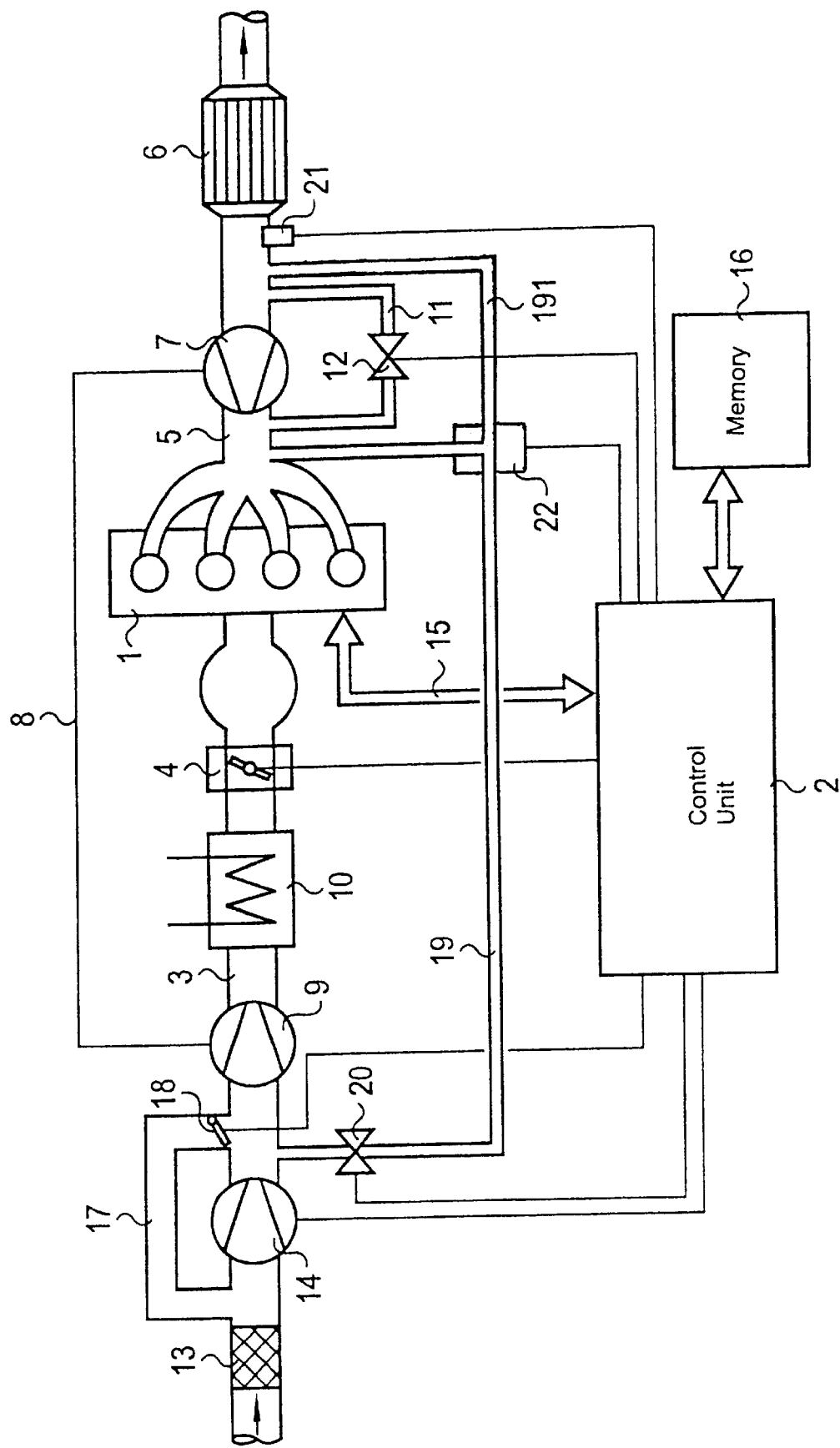
FIG. 3 is a block diagram of a variation of the first exemplary embodiment of FIG. 1, with a multi-way valve.
Figure 4:
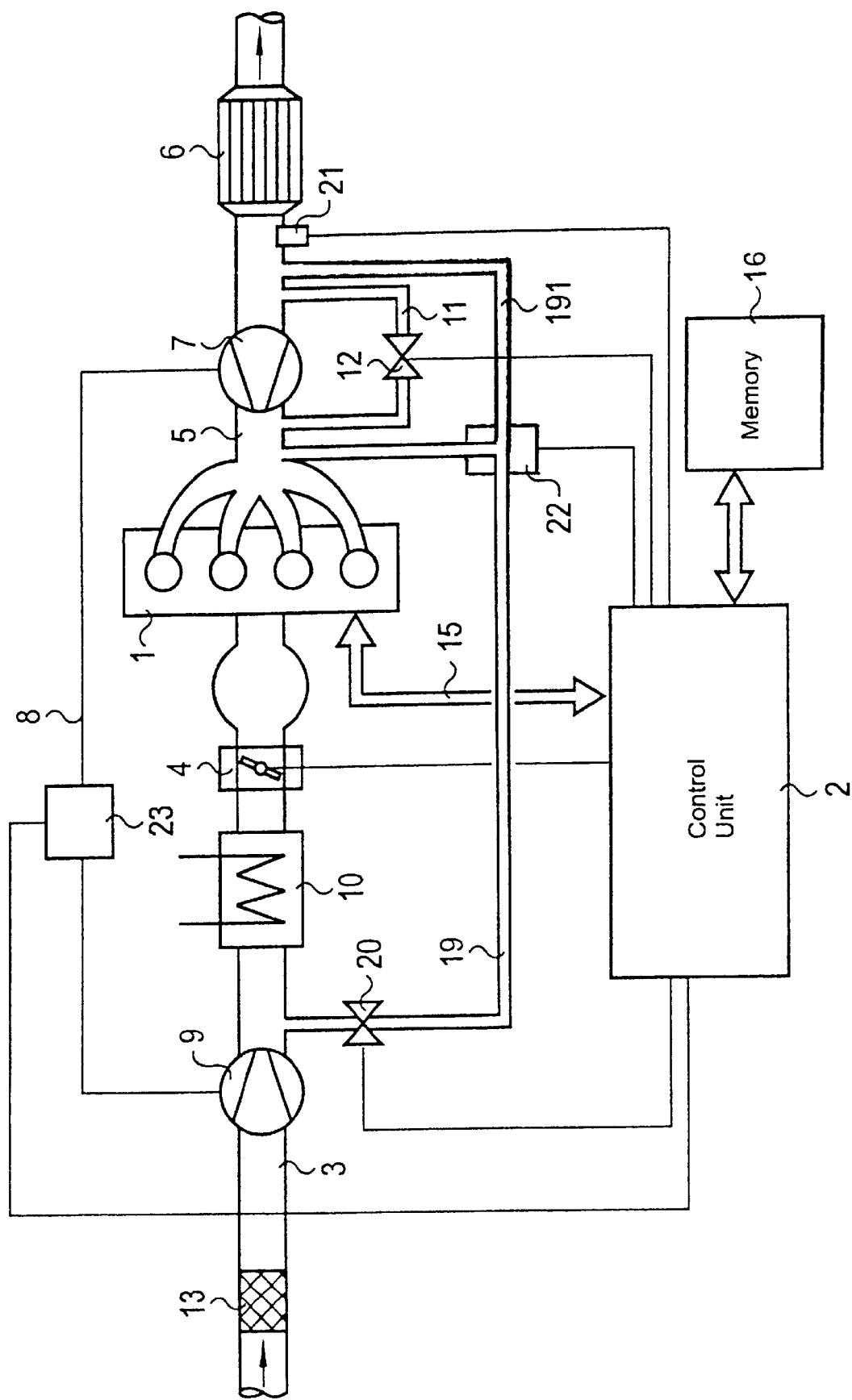
FIG. 4 is a block diagram of a variation of the second exemplary embodiment of FIG. 2, with a multi-way valve.

Instead of injecting the secondary air into the exhaust line 5 in immediate proximity to the exhaust valves, however, it is also possible to do this by way of an additional branch line 191 downstream of the turbine 7 of the exhaust-gas turbocharger, as is shown in FIGS. 3 and 4. It is furthermore possible, by way of an electrically actuatable multi-way valve 22 and as a function of the signal from the exhaust gas temperature sensor 21 or the detected temperature of the catalytic converter 6, to introduce the secondary air either in proximity to the exhaust valves or downstream of the turbine 7, immediately upstream of the catalytic converter 6, for example, or simultaneously at both points. Introduction of the secondary air downstream of the turbine is suitable when the catalytic converter has already reached a certain temperature.

For shutting off the secondary air line 19, an electrically actuatable shutoff valve 20 is provided, which can be configured either as an inlet/outlet valve entirely opening or closing the cross section of the exhaust gas recirculation line 19, or as a valve capable of continuously adjusting the opening cross section of the secondary air line 19. Downstream of the shutoff valve 20, a non-illustrated non-return valve may be additionally provided, which prevents a return flow of hot exhaust gases into the intake line 3 and to the electrically driven compressor 14.

For controlling the internal combustion engine 1, the control unit 2 is connected to the internal combustion engine 1 by way of a data and control line 15, here represented only in diagrammatic form. Signals from sensors (for example, temperature sensors for intake air, charge air and coolant, load sensor, speed sensor, charge pressure sensor) and signals for actuators (for example, injection valves, final control elements) are transmitted between the internal combustion engine 1 and the control unit 2 by way of the data and control line 15.

Such electronic control units, generally containing a microcomputer and assuming a multiplicity of other control functions in addition to ignition control in spark-ignition internal combustion engines and fuel injection, are known in the art, so that only those aspects of their construction and function relevant to the invention will be touched upon below.

A memory device 16, in which various tables and characteristic curves needed to control the internal combustion engine 1 are filed, is assigned to the control unit 2.

The following explains how the electrical compressor 14 described in the two-stage supercharging concept is used for heating the catalytic converter 6.

After starting the internal combustion engine 1, it is inquired whether heating of the catalytic converter 6 is necessary. The signal from the temperature sensor 21, for example, can be analyzed as criterion for this. If the temperature of the catalytic converter 6 is lower than its operating temperature, corresponding signals from the control unit 2 of the internal combustion engine 1 cause the flap 18 in the bypass 17 to close, and open the shutoff valve 20 in the secondary air line 19. The electrically driven compressor 14 is then actuated so that, via the air filter 13, it delivers high-oxygen fresh air into the exhaust line 5 of the internal combustion engine 1 by way of the secondary air line 19. The injected air leads to afterburning of the hot exhaust gas containing HC. Owing to the heat energy released, the downstream catalytic converter 6 reaches its operating temperature within a very short time.

Attainment of the operating temperature of the catalytic converter 6 can easily be determined by analysis of the signal from the temperature sensor 21 or by a time model. This is done from tests for a given internal combustion engine 1 and associated exhaust after-treatment system in order to determine the time taken by the catalytic converter 6 to reach its operating temperature as a result of providing secondary air by the electrically driven compressor 14. On starting the internal combustion engine 1, the electrically driven compressor 14 is then activated for the experimentally determined period of time and switched off again once this period has elapsed.

Figure 2:
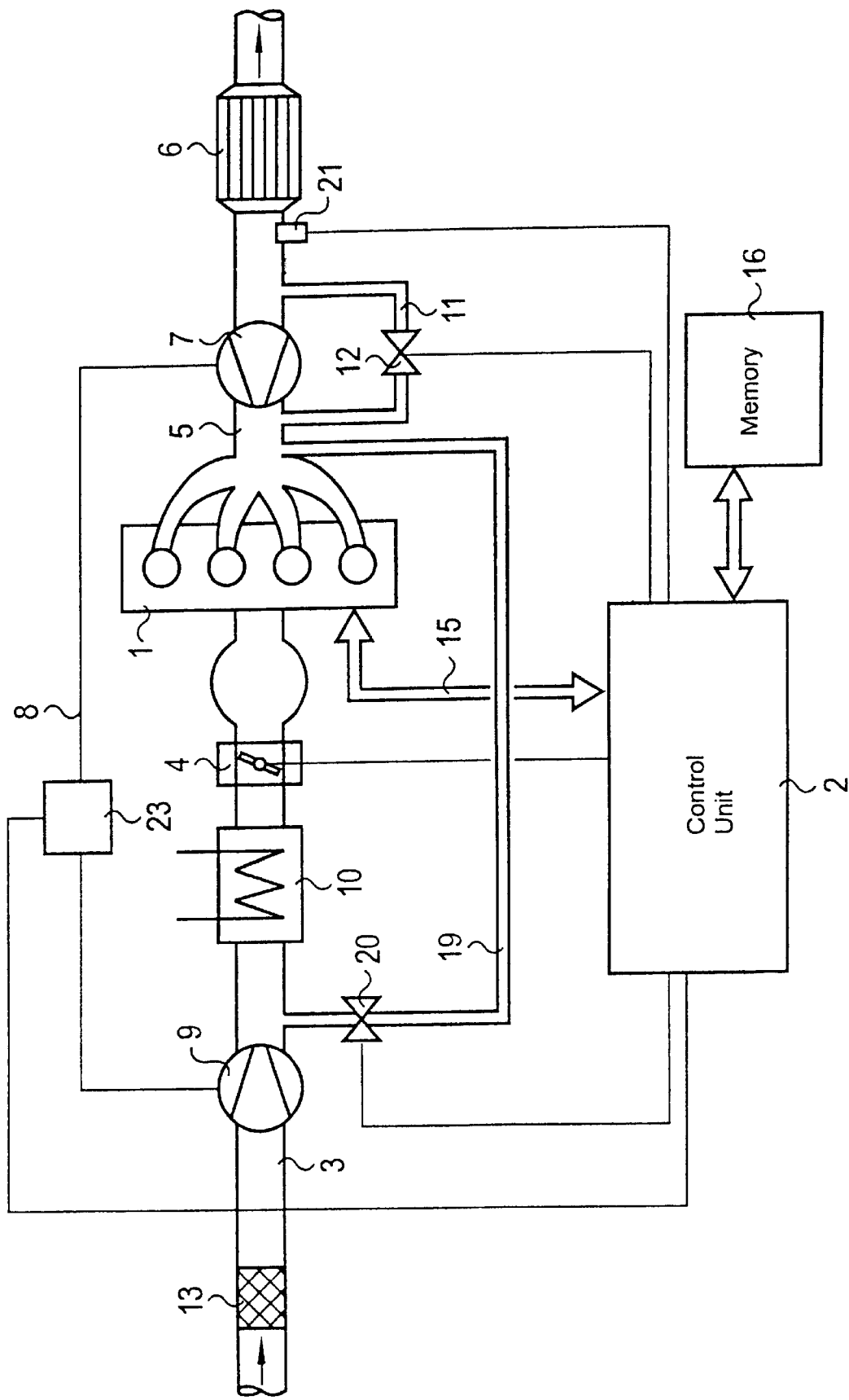
FIG. 2 is a block diagram of a second exemplary embodiment for the heating of the catalytic Converter in the supercharged internal combustion engine.

FIG. 2 shows a further exemplary embodiment, in which no additional compressor is provided in the intake line 3, but an electric motor 23 is disposed on the shaft 8 connecting the compressor 9 of the exhaust-gas turbocharger to the turbine 7 of the exhaust-gas turbocharger. The electric motor 23 serves to accelerate the turbocharger sufficiently for operation of the internal combustion engine 1 at low engine speeds.

In cold starting and warming up of the internal combustion engine 1, the electric motor 23 is activated by corresponding signals from the control unit 2, so that the motor 23 accelerates the compressor 9 and provides compressed air as secondary air for heating the catalytic converter 6. In contrast to the configuration according to FIG. 1, the secondary air line 19 in this case branches off downstream of the compressor 9. Alternatively the branch 19 may also exit downstream of the air intercooler 10, but upstream of the throttle valve 4. In its other configuration aspects the device is identical to the device described with reference to FIG. 1, the same reference numbers being used to denote the same components.

We claim:

1. A device for heating a catalytic converter disposed in an exhaust line of a supercharged internal combustion engine, comprising:
   an exhaust-gas turbocharger having a compressor disposed in an intake line of the internal combustion engine and a turbine with a shaft connected to and driving said compressor, said turbine disposed in the exhaust line of the supercharged internal combustion engine;
   an electric motor disposed on said shaft and additionally drives said compressor of said exhaust-gas turbocharger independently of said turbine of said exhaust-gas turbocharger in certain operating ranges of the supercharged internal combustion engine; and
   a branch connected to the intake tract downstream of said compressor, and through said branch at least a proportion of air compressed by said compressor can be diverted, and said branch is connected to the exhaust line upstream of the catalytic converter of the supercharged internal combustion engine, so that with said compressor switched on secondary air is introduced into the exhaust line as required.

2. The device according to claim 1, wherein said branch opens into the exhaust line at a point close to exhaust valves of the supercharged internal combustion engine.

3. The device according to claim 1, wherein said branch opens into the exhaust line at a point downstream of said turbine of said exhaust-gas turbocharger.

4. The device according to claim 1, including an electrically actuatable shutoff valve inserted in said branch.

5. The device according to claim 4, including a multi-way valve with connected branch lines inserted in said branch downstream of said electrically actuatable shutoff valve, by use of said multi-way valve the secondary air can either be introduced into the exhaust line at a point close to exhaust valves of the supercharged internal combustion engine, or into the exhaust line at a point downstream of said turbine of said exhaust-gas turbocharger, or simultaneously at both points.

6. A method for heating a catalytic converter disposed in an exhaust line of a supercharged internal combustion engine having an exhaust-gas turbocharger with a compressor disposed in an intake line of the internal combustion engine and driven by a shaft of a turbine disposed in the exhaust line of the supercharged internal combustion engine, which comprises the steps of:
   disposing an electric motor on the shaft for additionally driving the compressor of the exhaust-gas turbocharger independently of the turbine of the exhaust-gas turbocharger in certain operating ranges of the supercharged internal combustion engine; and
   feeding at least a proportion of air compressed by the compressor, as required, as secondary air into the exhaust line of the supercharged internal combustion engine upstream of the catalytic converter by way of a branch.

* * * * *